US011486749B2

(12) United States Patent
Huang

(10) Patent No.: US 11,486,749 B2
(45) Date of Patent: Nov. 1, 2022

(54) TIME-OF-FLIGHT GENERATING CIRCUIT AND CHIP, FLOW METER AND METHOD OF THE SAME

(71) Applicant: SHENZHEN GOODIX TECHNOLOGY CO., LTD., Guangdong (CN)

(72) Inventor: Yen-Yin Huang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 303 days.

(21) Appl. No.: 17/028,886

(22) Filed: Sep. 22, 2020

(65) Prior Publication Data

US 2021/0041277 A1 Feb. 11, 2021

Related U.S. Application Data

(63) Continuation of application No. PCT/CN2019/078811, filed on Mar. 20, 2019.

(51) Int. Cl.
*G01F 1/66* (2022.01)
*G01F 1/698* (2006.01)
*G01F 1/667* (2022.01)

(52) U.S. Cl.
CPC .............. *G01F 1/698* (2013.01); *G01F 1/667* (2013.01)

(58) Field of Classification Search
None
See application file for complete search history.

(56) References Cited

U.S. PATENT DOCUMENTS

| 4,442,719 A | 4/1984 | Allen et al. |
| 6,390,999 B1 * | 5/2002 | Zscheile ............. A61M 1/3626 604/4.01 |
| 6,575,044 B1 | 6/2003 | Feller |
| 9,267,829 B2 | 2/2016 | Chevrier et al. |
| 2016/0169721 A1 | 6/2016 | Chevrier et al. |
| 2017/0167904 A1 | 6/2017 | Sathyanarayana et al. |

FOREIGN PATENT DOCUMENTS

| CN | 102866261 A | 1/2013 |
| CN | 103874908 A | 6/2014 |

(Continued)

OTHER PUBLICATIONS

English Abstract of DE102017005208A1.
(Continued)

*Primary Examiner* — Harshad R Patel
(74) *Attorney, Agent, or Firm* — WPAT, P.C. Intellectual Property Attorneys; Anthony King

(57) ABSTRACT

The application discloses a time-of-flight generating circuit, coupled to a first transducer and a second transducer, wherein there is a distance greater than zero between the first transducer and the second transducer, and a fluid having a flow speed flows sequentially through the first transducer and the second transducer, wherein the time-of-flight generating circuit includes: a transmitter, coupled to the first transducer; a receiver, coupled to the second transducer; a signal processing circuit, coupled to the transmitter and the receiver; and a correlation circuit, a measuring circuit and a transformation circuit, coupled to the signal processing circuit. The application also discloses a chip, flow meter, and method of the same.

20 Claims, 9 Drawing Sheets

(56) References Cited

FOREIGN PATENT DOCUMENTS

| | | | |
|---|---|---|---|
| CN | 104697593 | A | 6/2015 |
| CN | 105424140 | A | 3/2016 |
| CN | 107014447 | A | 8/2017 |
| CN | 107328447 | A | 11/2017 |
| CN | 107782387 | A | 3/2018 |
| DE | 102005037458 | A1 | 2/2007 |
| DE | 102017005208 | A1 | 5/2018 |
| EP | 1982169 | A2 | 10/2008 |
| EP | 3299774 | A1 | 3/2018 |
| JP | H11514443 | A | 12/1999 |
| JP | 2013507624 | A | 3/2013 |
| WO | 2017040267 | A1 | 3/2017 |

OTHER PUBLICATIONS

English Abstract of DE102005037458A1.
English Abstract Translation of Foreign Reference CN102866261A.
English Abstract Translation of Foreign Reference CN103874908A.
English Abstract Translation of Foreign Reference CN104697593A.
English Abstract Translation of Foreign Reference CN105424140A.
English Abstract Translation of Foreign Reference CN107014447A.
English Abstract Translation of Foreign Reference CN107328447A.
English Abstract Translation of Foreign Reference CN107782387A.
International Searching Authority (ISA) Form 210—International Search Report of PCT/CN2019/078811.
International Searching Authority (ISA) Form 220—Notification of Transmittal of the International Search Report of PCT/CN2019/078811.
International Searching Authority (ISA) Form 237—Written Opinion of PCT/CN2019/078811.
As-filed PCT Request of PCT/CN2019/078811.
As-filed PCT Application of PCT/CN2019/078811.
Notification of Receipt of Search in Chinese (Form PCT/ISA/202) of PCT/CN2019/078811.
English Abstract Translation of JPH11514443A.
English Abstract Translation of JP2013507624A.

\* cited by examiner

US 11,486,749 B2

TIME-OF-FLIGHT GENERATING CIRCUIT AND CHIP, FLOW METER AND METHOD OF THE SAME

CROSS-REFERENCE TO RELATED APPLICATIONS

This application is a continuation of International Application No. PCT/CN2019/078811, filed on Mar. 20, 2019, the disclosure of which is hereby incorporated by reference in its entirety.

TECHNICAL FIELD

The present application relates to a time-of-flight generating circuit, and a chip, flow meter, and method of the same.

BACKGROUND

Ultrasonic flow meters are commonly used flow meters. Flow meters are widely applied in detecting the flow speed of a fluid; compared with other types of flow meters, ultrasonic flow meters have greater advantages in aspects like pressure loss, lowest detectable flow speed and installation cost; however, the accuracy thereof still needs to be improved, and therefore, further improvements and innovations thereto are necessary.

SUMMARY OF THE INVENTION

One purpose of the present application is to disclose a time-of-flight (TOF) generating circuit, and a chip, a flow meter, and a method of the same to address the above-mentioned issues.

One embodiment of the present application discloses a TOF generating circuit, coupled to a first transducer and a second transducer, wherein there is a distance greater than zero between the first transducer and the second transducer, and the first transducer and the second transducer are arranged in a pipeline filled with fluid, wherein the TOF generating circuit includes: a transmitter, coupled to the first transducer; a receiver, coupled to the second transducer; a signal generating circuit, configured to, under a first ambient factor, generate a first signal to the transmitter to cause the first transducer transmit a first transducer signal, wherein the first transducer signal is received by the second transducer and the receiver generates a reference signal to the signal generating circuit; and, under a second ambient factor, generate a second signal to the transmitter to cause the first transducer transmit a second transducer signal, wherein the second transducer signal is received by the second transducer and the receiver generates an input signal to the signal generating circuit; a correlation circuit, configured to at least receive the input signal to perform a correlation operation to generate a correlation signal; and a measuring circuit, configured to generate a measurement signal according to the correlation signal, wherein the measurement signal indicates a phase difference between the input signal and the reference signal, and the measurement signal includes a first measurement signal and a second measurement signal, wherein the first measurement signal is configured to indicate a phase compensation of the input signal and the reference signal, and the second measurement signal is configured to indicate a phase offset of the first transducer and the second transducer; and a transformation circuit, configured to selectively transform the measurement signal or the first measurement signal from a frequency domain to a time domain to generate a TOF difference signal, wherein the TOF difference signal is configured to indicate a difference of flight times between the first transducer and the second transducer.

One embodiment of the present application discloses a chip, which includes the above-mentioned TOF generating circuit.

One embodiment of the present application discloses a flow meter, which includes the above-mentioned TOF generating circuit; a first transducer; and a second transducer; wherein the TOF generating circuit is coupled to the first transducer and the second transducer.

One embodiment of the present application discloses a TOF generation method configured to control a transmitter and a receiver, wherein the transmitter is coupled to a first transducer, and the receiver is coupled to a second transducer, wherein there is a distance greater than zero between the first transducer and the second transducer, and the first transducer and the second transducer are arranged in a pipeline filled with fluid, wherein the TOF generation method includes: under a first ambient factor, generating a first signal to the transmitter to cause the first transducer transmit a first transducer signal; after the first transducer signal is received by the second transducer, generating a reference signal by using the receiver; under a second ambient factor, generating a second signal to the transmitter to cause the first transducer transmit a second transducer signal; after the second transducer signal is received by the second transducer, generating an input signal by using the receiver; at least receiving the input signal to perform a correlation operation to generate a correlation signal; generating a measurement signal according to the correlation signal, wherein the measurement signal indicates a phase difference between the input signal and the reference signal, and the measurement signal comprises a first measurement signal and a second measurement signal, wherein the first measurement signal is configured to indicates a phase compensation of the input signal and the reference signal, and the second measurement signal indicates a phase offset of the first transducer and the second transducer; selectively transforming the measurement signal or the first measurement signal from a frequency domain to a time domain to generate a TOF difference signal, wherein the TOF difference signal is configured to indicate a difference of flight times between the first transducer and the second transducer.

One embodiment of the present application discloses a TOF generating circuit, coupled to a first transducer and a second transducer, wherein there is a distance greater than zero between the first transducer and the second transducer, and the first transducer and the second transducer are arranged in a pipeline filled with fluid, wherein the TOF generating circuit includes: a transmitter, coupled to the first transducer; a receiver, coupled to the second transducer; a signal generating circuit, configured to, under a first ambient factor, generate a first signal to the transmitter to cause the first transducer transmit a first transducer signal, wherein the first transducer signal is received by the second transducer and the receiver generates a reference signal to the signal generating circuit; and, under a second ambient factor, generate a second signal to the transmitter to cause the first transducer transmit a second transducer signal, wherein the second transducer signal is received by the second transducer and the receiver generates an input signal to the signal generating circuit; a correlation circuit, configured at least to receive the input signal to perform a correlation operation to generate a correlation signal; and a measuring circuit, coupled to the correlation circuit and configured to generate a measurement signal according to the correlation signal, wherein the measurement signal indicates a phase difference between the input signal and the reference signal, and the measurement signal includes a first measurement signal and a second measurement signal, wherein the first measurement signal is configured to indicate a phase compensation of the input signal and the reference signal, and the second measurement signal is configured to indicate a phase offset of the first transducer and the second transducer; a transformation circuit, coupled to the measuring circuit and configured to transform the measurement signal from a frequency domain to a time domain to generate a TOF difference signal; a compensation circuit, coupled to the measuring circuit and configured to perform a compensation operation on the input signal according to the phase compensation, and generate a compensation signal after performing the compensation operation; and a synthesis circuit, coupled to the compensation circuit and configured to synthesize the reference signal and the compensation signal by using a specific ratio to generate a synthesized signal and output the synthesized signal to the correlation circuit, so that the correlation circuit receives the input signal and the synthesized signal to generate the correlation signal.

DETAILED DESCRIPTION

Figure 1:
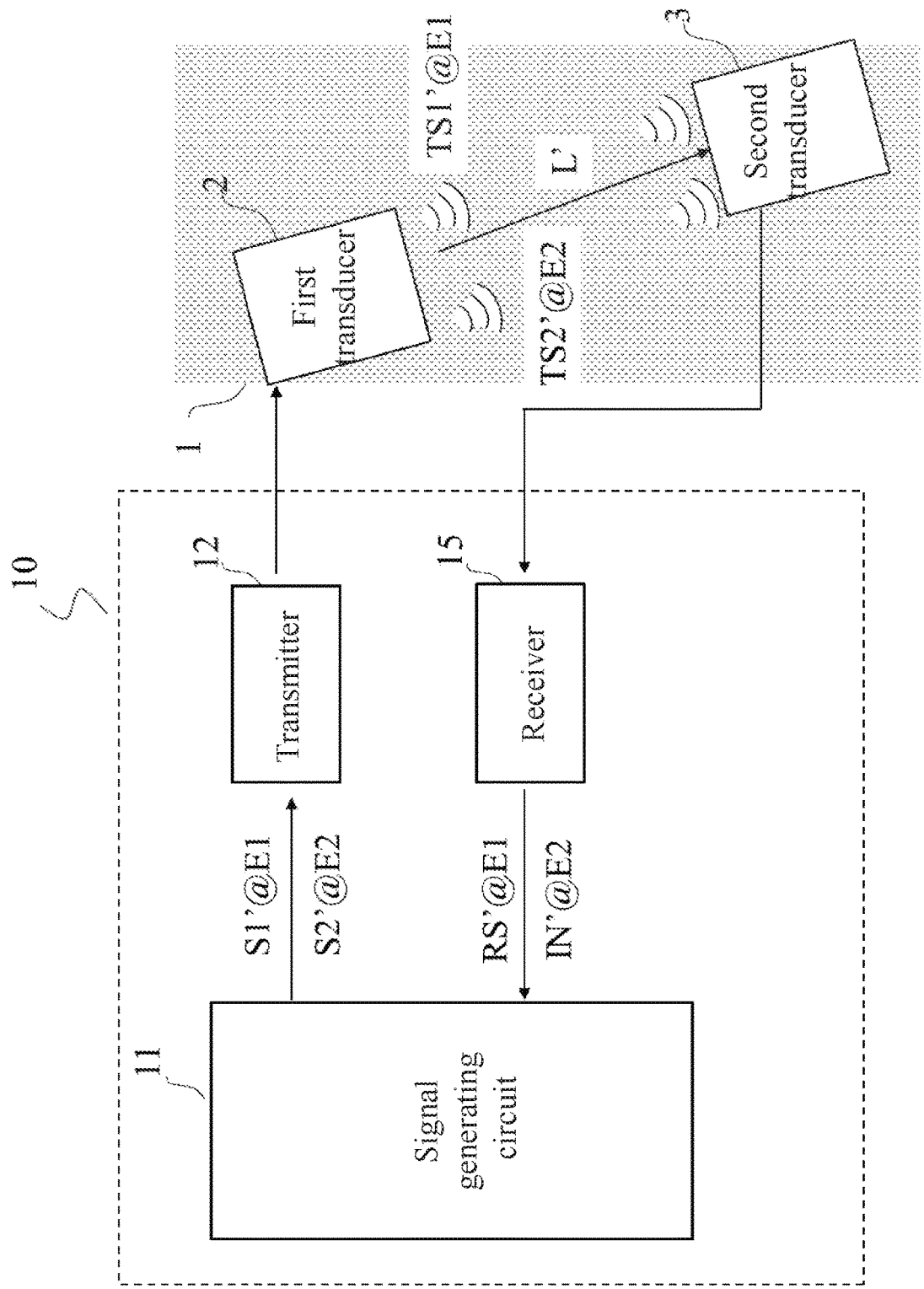
FIG. 1 is a schematic diagram illustrating a TOF generating circuit.

The following disclosure provides many different embodiments, or examples, for implementing different features of the invention. Specific examples of components and arrangements are described below to simplify the present disclosure. As could be appreciated, these are, of course, merely examples and are not intended to be limiting. For example, the formation of a first feature over or on a second feature in the description that follows may include embodiments in which the first and the second features are formed in direct contact, and may also include embodiments in which additional features may be formed between the first and the second features, such that the first and the second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," and the like, may be used herein for the ease of the description to describe one element or feature's relationship with respect to another element(s) or feature(s) as illustrated in the drawings. The spatially relative terms are intended to encompass different orientations of the device in use or operation in addition to the orientation depicted in the figures. The apparatus may be otherwise oriented (e.g., rotated by 90 degrees or at other orientations) and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. As could be appreciated, other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed considering the number of reported significant digits and by applying ordinary rounding techniques. Ranges can be expressed herein as from one endpoint to another endpoint or between two endpoints. All ranges disclosed herein are inclusive of the endpoints unless specified otherwise.

In conventional flow rate measuring systems using correlation operation, since the characteristics of the transducer changes as the temperature changes, the capacitance of the parasitic capacitor generally increases as the temperature in the transducer increases with a variation of as much as 25%. The variation in the capacitance affects not only the waveform of the driving signal but also the phase shift of the resonance frequency point and parallel resonance frequency points. Generally speaking, the equivalent impedance near the resonance points can vary up to 40%, and such variation would affect the voltage across the transducer.

The TOF generating circuit proposed in this application can calculate the TOF difference of flight times between the transducers through the correlation operation in the case of changes of ambience (such as temperature variation).

The present application provides TOF generating circuits 30, 50, 70 for calculating the signal TOF and the current flow speed of the fluid; the present application also provides a chip, which includes the TOF generating circuit 30, 50 or 70. In some embodiments, the TOF generating circuit 30, 50, 70 can be applied in a transducer device, for example, the present application also provides a flow meter, which includes the TOF generating circuit 30, 50 or 70, the first transducer 302, 502 or 702, and the second transducer 304, 504 or 704. For example, the above-mentioned flow meter can be used to sense the flow speed and/or the flow rate of gas or liquid; however, the present application is not limited thereto.

FIG. 1 is a schematic diagram illustrating a TOF generating circuit 10 that is applied in a flow meter. The TOF generating circuit 10 is coupled to a first transducer 2 and a second transducer 3. The transducer is a component capable of transforming the energy in one form into another form. The forms of energy may include, electric energy, mechanical energy, electromagnetic energy, light energy, chemical energy, sound energy thermal energy, etc.; yet the present application is not particularly limited, and the transducer may include any component capable of transforming energy.

The first transducer 2 and the second transducer 3 are installed in a pipeline 1 which is filled with a fluid (e.g., liquid or gas), and the transmission direction of the first transducer 2 faces the second transducer 3; the transmission direction of the second transducer 3 faces the first transducer 2. There is a distance L' between the first transducer 2 and the second transducer 3, and L' is greater than zero. As shown in FIG. 1, the TOF generating circuit 10 includes a signal generating circuit 11, a transmitter 12, and a receiver 15, wherein the transmitter 12 is coupled to the first transducer 2, and the receiver 15 is coupled to the second transducer 3.

The signal generating circuit 11 is configured to, under the first ambient factor E1, generate a first signal S1' from the transmitter 12 through the first transducer 2 to transmit a first transducer signal TS1', wherein the first transducer signal TS1' is received by the second transducer 3; and the receiver 15 generates a reference signal RS' to the signal generating circuit 11. The signal generating circuit 11 is also configured to, under the second ambient factor E2, generate a second signal S2', and transmit a second transducer signal TS2' from the transmitter 12 through the first transducer 2, wherein the second transducer signal TS2' is received by the second transducer 3, and the receiver 15 generates an input signal IN' to the signal generating circuit 11. In the present embodiment, the first ambient factor E1 and the second ambient factor E2 include the ambient temperature and/or the flow speed of the fluid in the pipeline 1.

In order to calculate the flow speed of the fluid so as to obtain the flow rate of the fluid, in one embodiment, the phase difference between the reference signal RS' and the input signal IN' is calculated, thereby obtaining the TOF difference between the reference signal RS' and the input signal IN'.

Figure 2:
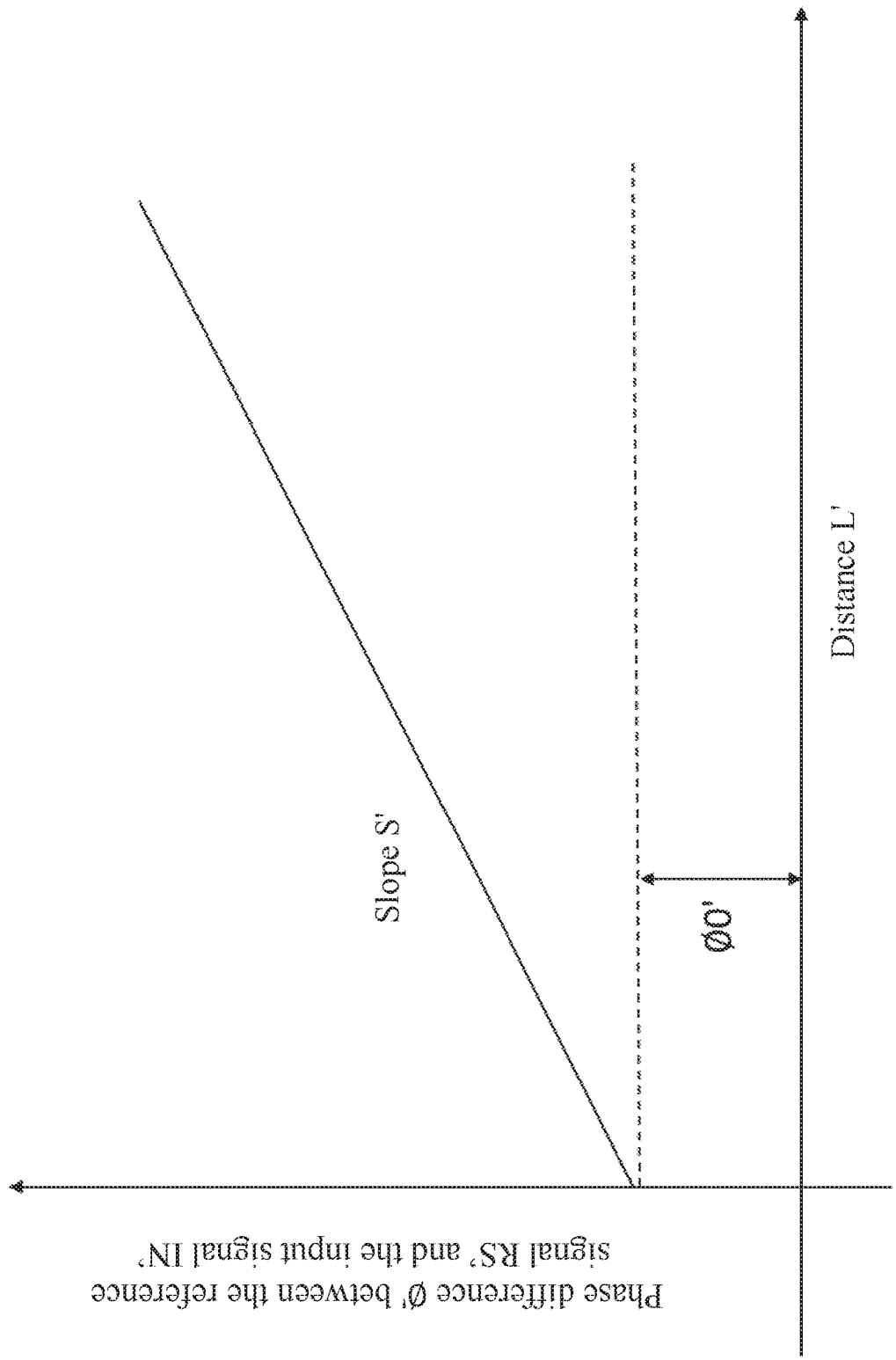
FIG. 2 is a schematic diagram illustrating the distance between the transducers and the transformation of the phase difference between the reference signal and the input signal.

FIG. 2 is a schematic diagram illustrating the transformation of the distance L' between the first transducer 2 and the second transducer 3 and the phase difference Ø' between the reference signal RS' and the input signal IN'. After performing a correlation operation on the reference signal RS' and the input signal IN', the phase difference between Ø' between the reference signal RS' and the input signal IN' is obtained. As shown in FIG. 2, the distance L' and the phase difference Ø' present a linear function, wherein the linear function can be expressed as Ø'=Ø0'+S'·L', where Ø0' is a constant, which is determined depending on the ambient deviation due to the ambient temperature, whereas S'·L' represents the phase compensation between reference signal RS' and the input signal IN'. In the present embodiment, the ambient deviation represents the characteristic variation of the first transducer 2 and the second transducer 3 when the ambient temperature changes due to semiconductor process differences. S' is the slope of the function, and its magnitude is determined by said flow speed of the fluid, and from the above function, it can be seen that both the ambient temperature and flow speed will affect the phase difference Ø'. Therefore, in order to get a more accurate TOF difference, it is necessary to calculate the TOF difference by taking into account the effect of the ambient temperature. The amount of the difference in the characteristic variation between the first transducer 2 and the second transducer 3 caused by the ambient temperature and the flow speed.

Figure 3:
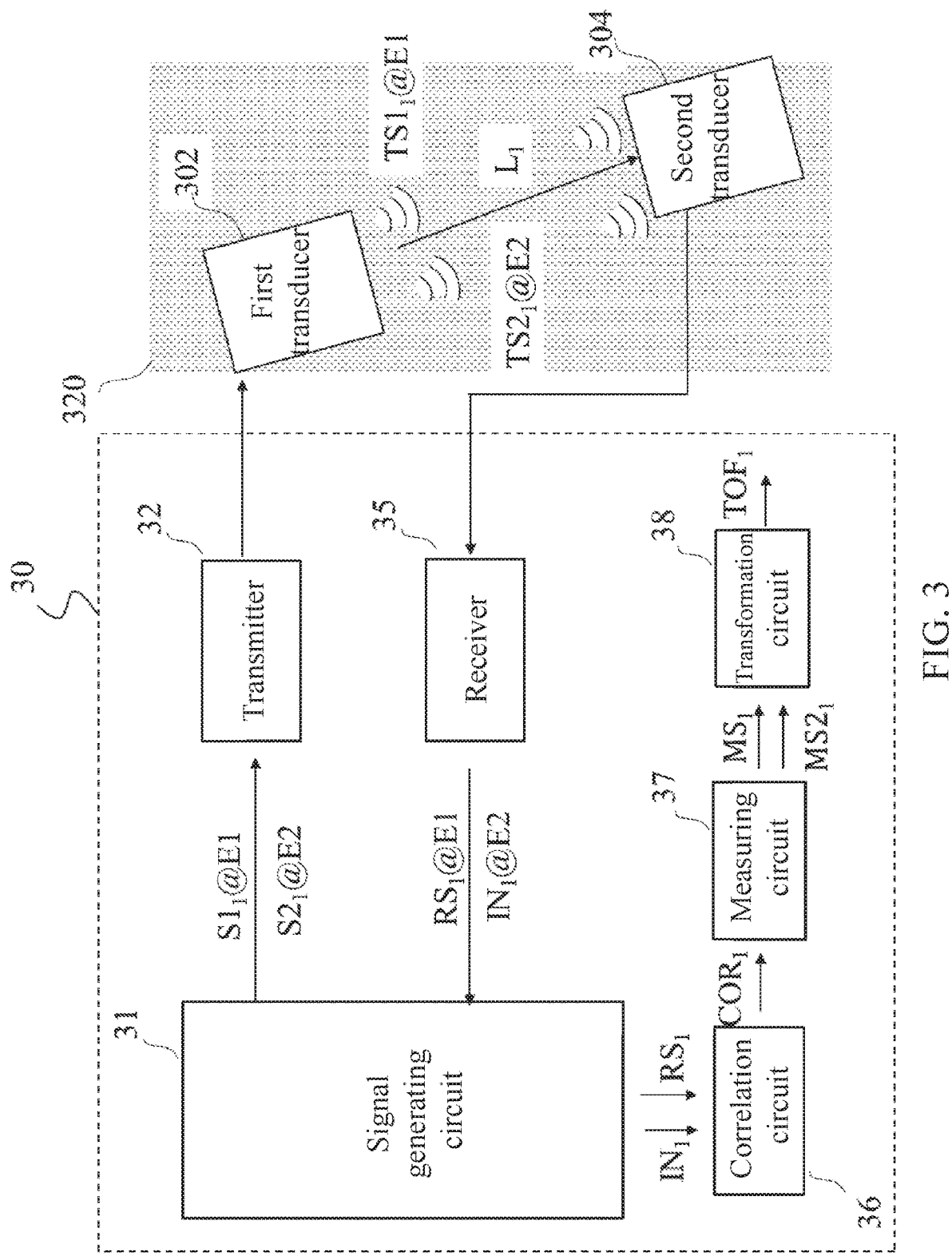
FIG. 3 is a schematic diagram illustrating a TOF generating circuit according to the first embodiment of the present application.

FIG. 3 is a schematic diagram illustrating the TOF generating circuit 30 according to the first embodiment of the present application. The TOF generating circuit 30 is coupled to a first transducer 302 and a second transducer 304. Similar to the first transducer 2 and the second transducer 3, the first transducer 302 and the second transducer 304 are installed in a pipeline 320 filled with fluid (e.g., liquid or gas), and the transmission direction of the first transducer 302 faces the second transducer 304; the transmission direction of the second transducer 304 faces the first transducer 302. The distance between the first transducer 302 and the second transducer 304 is $L_1$, and $L_1$ greater than zero. As shown in FIG. 3, the TOF generating circuit 30 includes a signal generating circuit 31, a transmitter 32 and a receiver 35, wherein the transmitter 32 is coupled to the first transducer 302, and the receiver 35 is coupled to the second transducer 304.

Similar to the signal generating circuit 11, the transmitter 12, and the receiver 15, the signal generating circuit 31 is configured to, under a first ambient factor E1, generate a first signal $S1_1$ from the transmitter 32 through the first transducer 302 to transmit a first transducer signal $TS1_1$, wherein the first transducer signal $TS1_1$ is received by the second transducer 304, and the receiver 35 generates a reference signal $RS_1$ to the signal generating circuit 31. The signal generating circuit 31 is also configured to, under a second ambient factor E2, generate a second signal $S2_1$, and transmit a second transducer signal $TS2_1$ from the transmitter 32 through the first transducer 302, wherein the second transducer signal $TS2_1$ is received by the second transducer 304, and the receiver 35 generates an input signal $IN_1$ to the signal generating circuit 31. In the present embodiment, the signal generating circuit 31 includes a storage device (not shown in the drawing), configured to store the input signal $IN_1$ and the reference signal $RS_1$ received by the receiver 35. In the present embodiment, the first ambient factor E1 and the second ambient factor E2 include the ambient temperature and/or the flow speed of the fluid in the pipeline 320.

TOF generating circuit 30 further includes a correlation circuit 36, a measuring circuit 37, and a transformation circuit 38. The correlation circuit 36 receives the reference signal $RS_1$ and the input signal $IN_1$ from the signal generating circuit 31 and performs a correlation operation on the reference signal $RS_1$ and the input signal $IN_1$ to generate a correlation signal $COR_1$, wherein the correlation operation includes performing fast Fourier transform on the reference signal $RS_1$ and the input signal $IN_1$, whereas the correlation signal $COR_1$ represents the correlation phase response between the reference signal $RS_1$ and the input signal $IN_1$. The measuring circuit 37 receives the correlation signal $COR_1$ from the correlation circuit 36 and measure the correlation signal $COR_1$ to generate a measurement signal $MS_1$.

Figure 4:
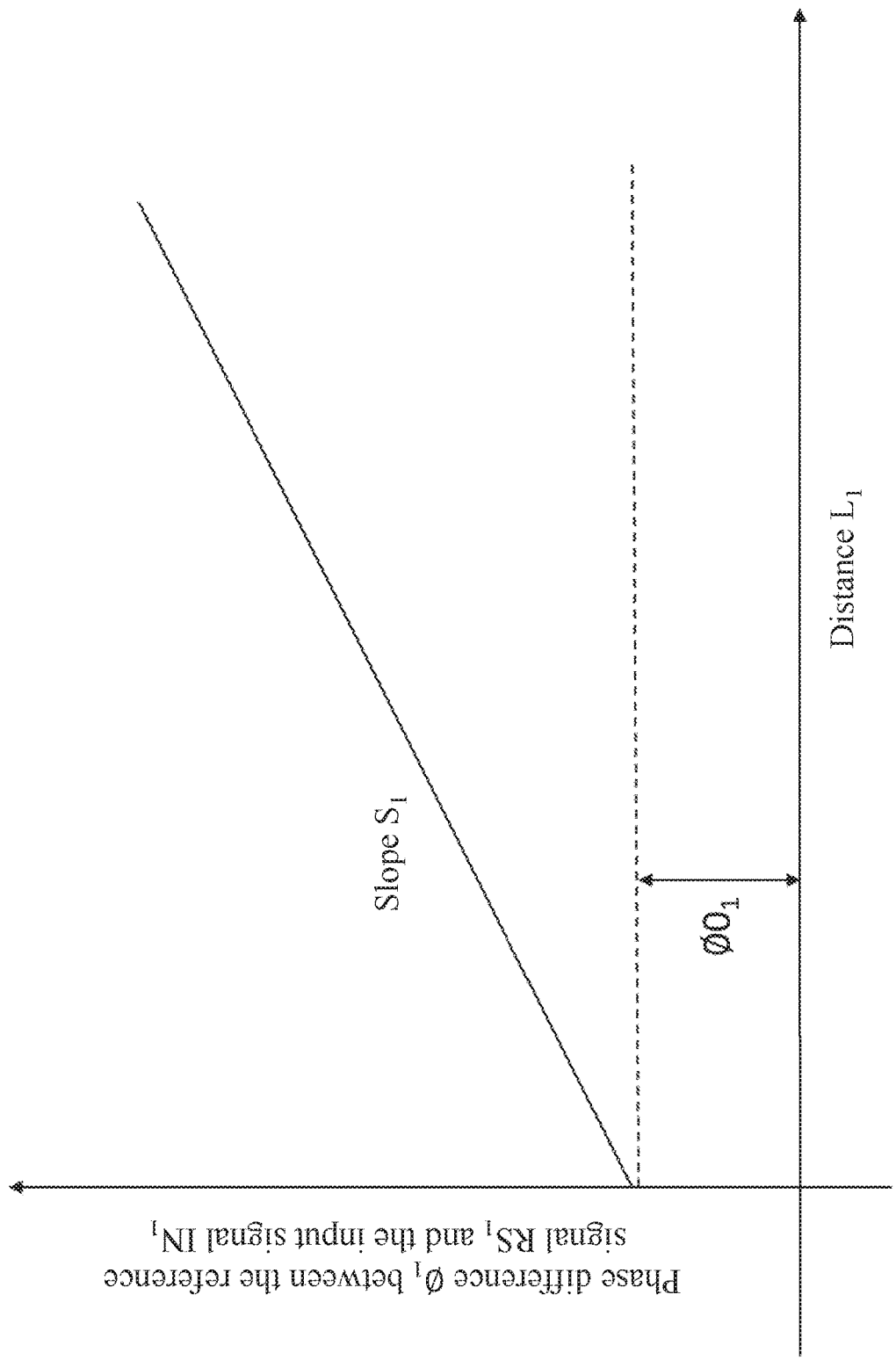
FIG. 4 is a schematic diagram illustrating the distance between the transducers of FIG. 3 and the transformation of the phase difference between the reference signal and the input signal.

FIG. 4 is a schematic diagram illustrating the transformation of the distance $L_1$ between the first transducer 302 and the second transducer 304 and the phase difference $Ø_1$ between the reference signal $RS_1$ and the input signal $IN_1$.

After the correlation circuit 36 performs the correlation operation on the reference signal $RS_1$ and the input signal $IN_1$, the correlation signal $COR_1$ is generated, and the measuring circuit 37 measures the correlation signal $COR_1$ to obtain the measurement signal $MS_1$. After performing the correlation operation on the reference signal $RS_1$ and the input signal $IN_1$, a phase difference $\varnothing_1$ between the reference signal $RS_1$ and the input signal $IN_1$ is obtained. In other words, the measurement signal $MS_1$ represents the phase difference $\varnothing_1$. Referring to both embodiments in FIG. 2 and FIG. 4, the phase difference $\varnothing_1$ can be expressed as $\varnothing_1 = \varnothing 0_1 + S_1 \cdot L_1$; that is, the measurement signal $MS_1$ includes the first measurement signal $MS1_1$ and the second measurement signal $MS2_1$, wherein the first measurement signal $MS1_1$ represents the phase compensation indicated by $S_1 \cdot L_1$, whereas the second measurement signal $MS2_1$ represents the ambient deviation indicated by the $\varnothing 0_1$. In the present embodiment, measuring circuit 37 adopts the least mean-square (LMS) method to obtain the measurement signal $MS_1$.

Referring to FIG. 3 once again, the transformation circuit 38 receives the measurement signal $MS_1$ and the second measurement signal $MS2_1$ from the measuring circuit 37 and then subtracted the second measurement signal $MS2_1$ from the measurement signal $MS_1$ to obtain the first measurement signal $MS1_1$, and transform the first measurement signal $MS1_1$ from a frequency domain into a time domain to obtain a TOF difference signal $TOF_1$. In some embodiments, the transformation circuit 38 may simultaneously obtain the measurement signal $MS_1$, the first measurement signal $MS1_1$, and the second measurement signal $MS2_1$, and transform the first measurement signal $MS1_1$ from the frequency domain into the time domain to obtain the TOF difference signal $TOF_1$. In this case, the TOF difference signal $TOF_1$ represents the TOF difference when the input signal $IN_1$ and reference signal $RS_1$ fly between the first transducer 302 and the second transducer 304.

Since the transformation circuit 38 deducts the part of the ambient deviation caused by the temperature represented by the second measurement signal $MS2_1$ from the TOF difference signal $TOF_1$, the thus-obtained TOF difference signal $TOF_1$ will only include less variation due to the temperature change. In other words, the TOF generating circuit proposed by the present application can be used to obtain a more accurate TOF difference signal $TOF_1$. It should be noted that, during the operation when the transformation circuit 38 outputs the TOF difference signal $TOF_1$, it is feasible to first transform the measurement signal $MS_1$ from the frequency domain into the time domain, and then a portion of the second measurement signal $MS2_1$ with a fixed multiplicity is subtracted from the time domain to obtain the first measurement signal $MS1_1$. In general, depending on the actual application requirements, the transformation circuit 38 may selectively transform the measurement signal $MS_1$ or the first measurement signal $MS1_1$ from the frequency domain into the time domain to obtain the TOF difference signal $TOF_1$.

It should be noted that the TOF generating circuit 30 may further include a receiver coupled to the first transducer 302 and a transmitter coupled to the second transducer 304, and under the first ambient factor E1 and the second ambient factor E2, the transmitter coupled to the second transducer 304 is used to transmit two signals to the receiver coupled to the first transducer 302, to generate the reference signal and the input signal, respectively. Then, the TOF difference signal is generated following the above-mentioned embodiment discussed in connection with FIG. 3. In some embodiments, the TOF generating circuit 30 further includes a calculation circuit (not shown in the drawing), configured to calculate the flow speed of the fluid according to the TOF difference signal and the TOF difference signal $TOF_1$, and then calculate the flow rate of the fluid.

Figure 5:
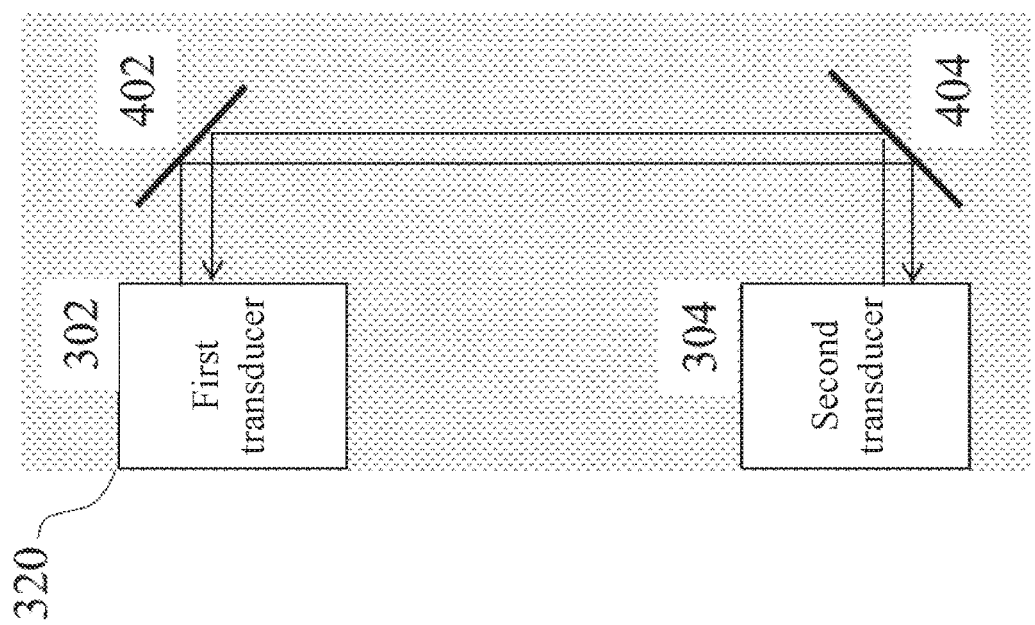
FIG. 5 is a schematic diagram illustrating the arrangement of the first transducer and the second transducer according to embodiments of the present application.

It should be noted that the arrangement and position of the first transducer 302 and the second transducer 304 in the pipeline 320 are not limited to those shown in FIG. 1 and FIG. 3. FIG. 5 is a schematic diagram illustrating the arrangement of the first transducer 302 and the second transducer 304 in the pipeline 320 according to one embodiment of the present application. In the embodiment of FIG. 5, reflective plates 402 and 404 are arranged in the pipeline 320 and are configured to reflect the signal transmitted through the first transducer 302 to the second transducer 304 and reflect the signal transmitted through the second transducer 304 to the first transducer 302. In this embodiment, the distance $L_1$ between the first transducer 302 and the second transducer 304 shall be considered as the distance passed by the signal; in other words, the distance $L_1$ is the distance starting from the first transducer 302, through the reflective plates 402 and 404 to the second transducer 304. In the following drawings, the positions of the transducers are illustrated in the same way as those shown in FIG. 1 and FIG. 3, for the sake of brievity.

Figure 6:
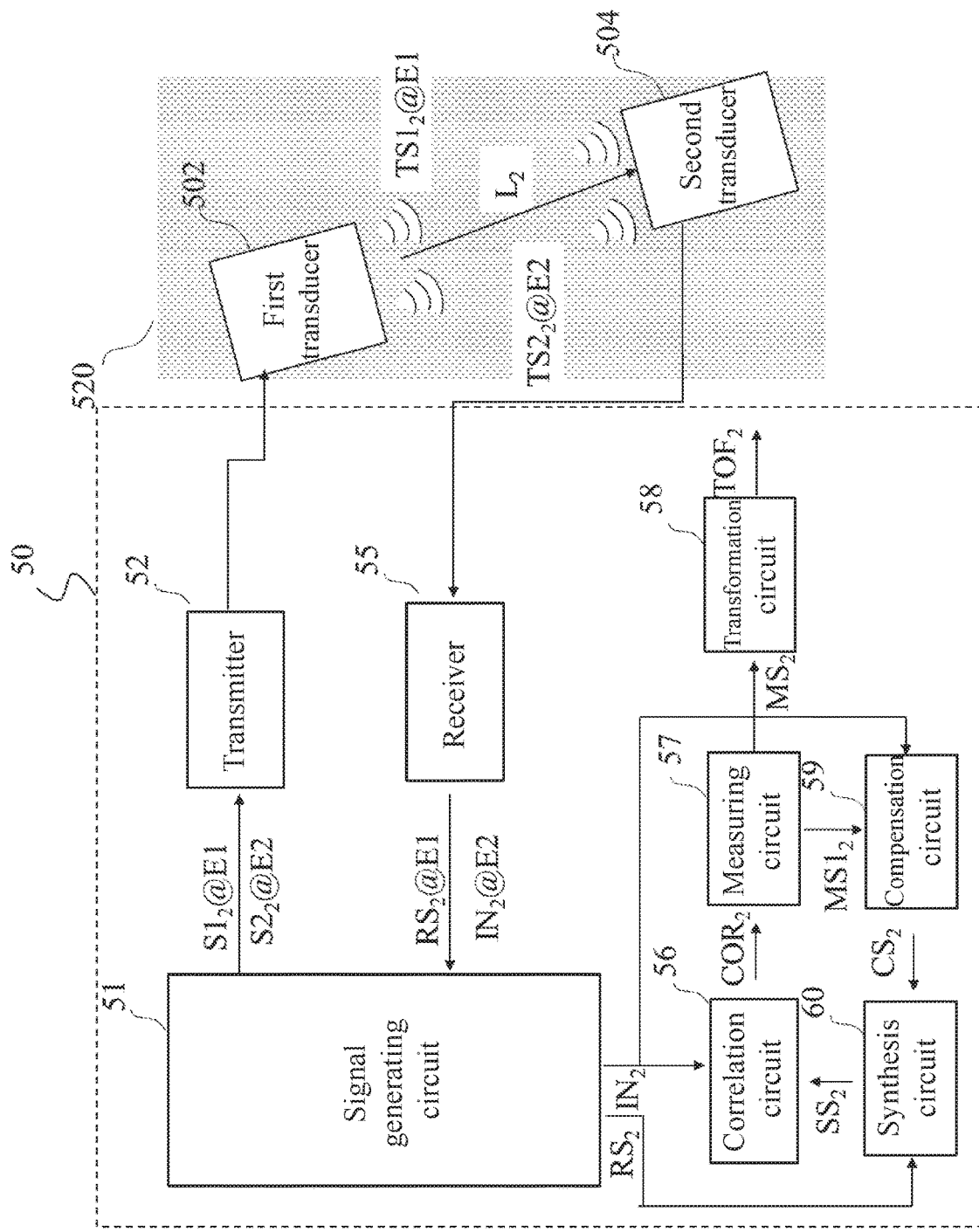
FIG. 6 is a schematic diagram illustrating a TOF generating circuit according to the second embodiment of the present application.

FIG. 6 is a schematic diagram illustrating the TOF generating circuit 50 according to the second embodiment of the present application. The TOF generating circuit 50 is coupled to a first transducer 502 and a second transducer 504; similar to the first transducer 302 and the second transducer 304, the first transducer 502 and the second transducer 504 are installed in a pipeline 520 filled with fluid (e.g., liquid or gas), and the transmission direction of the first transducer 502 faces the second transducer 504; the transmission direction of the second transducer 504 faces the first transducer 502. The distance between the first transducer 502 and the second transducer 504 is $L_2$, and $L_2$ is greater than zero. As shown in FIG. 5, the TOF generating circuit 50 includes a signal generating circuit 51, a transmitter 52, and a receiver 55, wherein the transmitter 52 is coupled to the first transducer 502, and the receiver 55 is coupled to the second transducer 504. Similar to the signal generating circuit 31, the transmitter 32 and the receiver 35, the signal generating circuit 51 is configured to, under a first ambient factor E1, generate a first signal $S1_2$ from the transmitter 52 through first transducer 502 to transmit a first transducer signal $TS1_2$, wherein the first transducer signal $TS1_2$ is received by the second transducer 504, and the receiver 55 generates a reference signal $RS_2$ to the signal generating circuit 51. The signal generating circuit 51 is also configured to, under the second ambient factor E2, generate a second signal $S2_2$, and transmit a second transducer signal $TS2_2$ from the transmitter 52 through the first transducer 502, wherein the second transducer signal $TS2_2$ is received by the second transducer 504, and the receiver 55 generates an input signal $IN_2$ to the signal generating circuit 51. In the present embodiment, the signal generating circuit 51 includes a storage device (not shown in the drawing), configured to store the input signal $IN_2$ and the reference signal $RS_2$ received by the receiver 55.

The TOF generating circuit 50 further includes a correlation circuit 56, a measuring circuit 57, a transformation circuit 58, a compensation circuit 59, and a synthesis circuit 60. The correlation circuit 56 receives the input signal $IN_2$ from the signal generating circuit 51 and receives a synthesized signal $SS_2$ from the synthesis circuit 60 and performs a correlation operation on the input signal $IN_2$ and the synthesized signal $SS_2$ to generate a correlation signal $COR_2$, wherein the correlation operation includes performing the fast Fourier transform on the synthesized signal $SS_2$ and the input signal $IN1_2$, whereas the correlation signal $COR_2$ represents the correlation phase response between the synthesized signal $SS_2$ and the input signal $IN1_2$. The measuring circuit 57 receives the correlation signal $COR_2$ from the correlation circuit 56 and measures the correlation signal $COR_2$ to generate a measurement signal $MS_2$.

Figure 7:
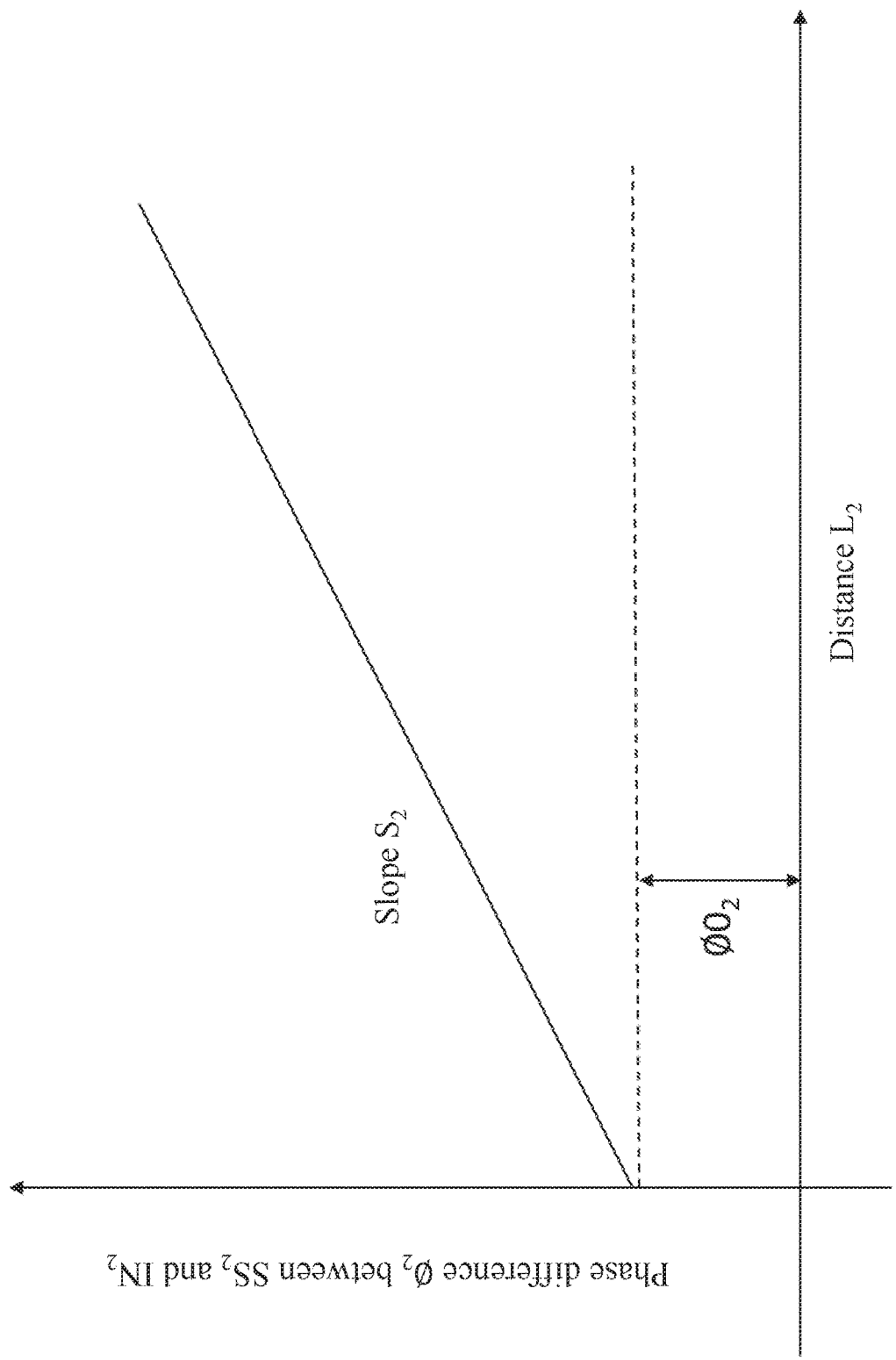
FIG. 7 is a schematic diagram illustrating the distance between the transducers of FIG. 6 and the transformation of the phase difference between the reference signal and the input signal.

FIG. 7 is a schematic diagram illustrating the distance $L_2$ between the first transducer 502 and the second transducer 504 and the transformation of the phase difference $\varnothing_2$ between the synthesized signal $SS_2$ and the input signal $IN_2$. After the correlation circuit 56 performs a correlation operation on the synthesized signal $SS_2$ and the input signal $IN_2$, it generates the correlation signal $COR_2$, and the measuring circuit 57 measures the correlation signal $COR_2$ to obtain the measurement signal $MS_2$. After performing perform a correlation operation on the synthesized signal $SS_2$ and the input signal $IN_2$, a phase difference between $\varnothing_2$ between the synthesized signal $SS_2$ and the input signal $IN_2$ are obtained. In other words, the measurement signal $MS_2$ represents the phase difference $\varnothing_2$. Referring to the embodiments in both FIG. 2 and FIG. 7, the phase difference $\varnothing_2$ can be expressed as $\varnothing_2 = \varnothing 0_2 + S_2 \cdot L_2$; in other words, the measurement signal $MS_2$ includes a first measurement signal $MS1_2$ and a second measurement signal $MS2_2$, wherein the first measurement signal $MS1_2$ represents a phase compensation indicated by $S_2 \cdot L_2$, whereas the second measurement signal $MS2_2$ represents the ambient deviation indicated by $\varnothing 0_2$. In the present embodiment, the measuring circuit 57 adopts the LMS method to obtain the measurement signal $MS_2$.

Referring back to FIG. 6, the compensation circuit 59 receives the input signal $IN_2$ from the signal generating circuit 51 and receives the first measurement signal $MS1_2$ of the measurement signal $MS_2$ from the measuring circuit 57, and performs compensation on the input signal $IN_2$ according to the first measurement signal $MS1_2$ to generate a compensation signal $CS_2$. More specifically, $S_2 \cdot L_2$ represented by the first measurement signal $MS1_2$ may be further expressed as $e^{-j \cdot S_2 \cdot L_2}$; therefore, in order to compensate for the phase compensation represented by $S_2 \cdot L_2$, the compensation circuit 59 multiplies the input signal $IN_2$ by $e^{j \cdot S_2 \cdot L_2}$ and then performs the complex conjugate computation to compensate for the difference generated by the $S_2 \cdot L_2$, so as to generate the compensation signal $CS_2$.

The synthesis circuit 60 receives the reference signal $RS_2$ from the signal generating circuit 51 and receives the compensation signal $CS_2$ from the compensation circuit 59, and then synthesize the reference signal $RS_2$, and with compensation signal $CS_2$ with a specific ratio to generate the synthesized signal $SS_2$. More specifically, the synthesized signal $SS_2$ can be expressed as $SS_2 = (n-1)/n \cdot RS_2 + 1/n \cdot$ compensation signal $CS_2$, where n is an integer greater than 1; in this way, the reference signal $RS_2$ is corrected to a waveform close to the input signal $IN_2$ in each feedback.

The transformation circuit 58 receives the measurement signal $MS_2$ from the measuring circuit 57 and transforms the measurement signal $MS_2$ from a frequency domain into a time domain to obtain the TOF difference signal $TOF_2$, wherein the TOF difference signal $TOF_2$ represents the difference of flight times for the input signal $IN_2$ and the reference signal $RS_2$ to fly between the first transducer 502 and the second transducer 504. Through continuous iteration, the signal variation between $RS_2$ and $IN_2$ will gradually decrease, so that the error of the related calculation will not get magnified.

It should be noted that the TOF generating circuit 50 may further include a receiver coupled to the first transducer 502 and a transmitter coupled to the second transducer 504, and under the first ambient factor E1 and the second ambient factor E2, it is feasible to use the transmitter coupled to the second transducer 504 to transmit two signals to the receiver coupled to the first transducer 502, so as to generate the reference signal and the input signal, respectively. Then, the TOF difference signal is generated following the above-mentioned embodiment discussed in connection with FIG. 6. In some embodiments, the TOF generating circuit 50 further includes a calculation circuit (not shown in the drawing), configured to calculate the flow speed of the fluid according to the TOF difference signal and the TOF difference signal $TOF_2$, and then calculate the flow rate of the fluid.

Figure 8:
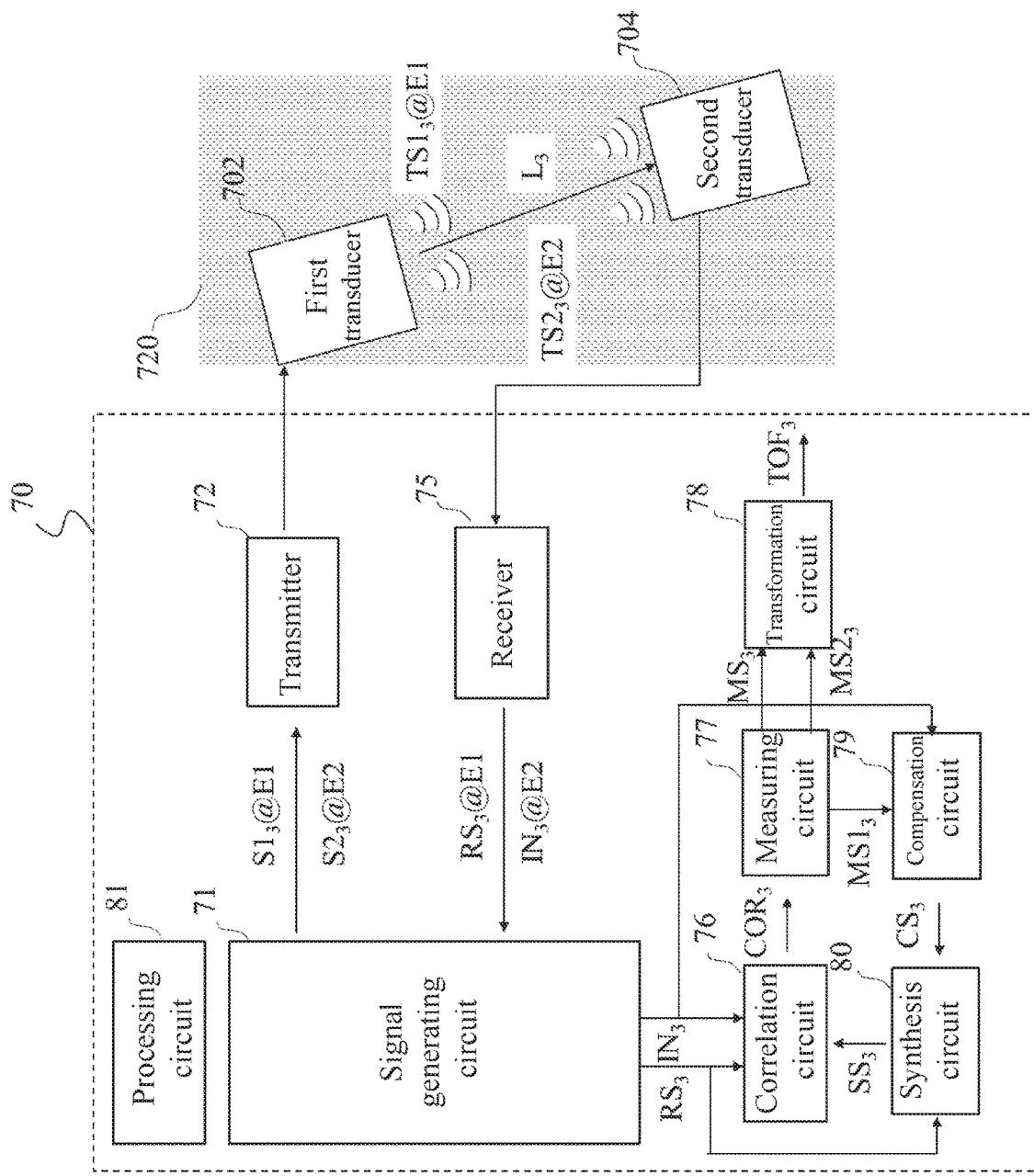
FIG. 8 is a schematic diagram illustrating a TOF generating circuit according to the third embodiment of the present application.

FIG. 8 is a schematic diagram illustrating a TOF generating circuit 70 according to the present application third embodiment. The TOF generating circuit 70 is coupled to first transducer 702 and the second transducer 704; similar to the first transducer 502 and the second transducer 503, the first transducer 702 and the second transducer 704 are installed in a pipeline 720 filled with fluid (e.g., liquid or gas), and the transmission direction of the first transducer 702 faces the second transducer 704; the transmission direction of second transducer 704 faces the first transducer 702. The distance between the first transducer 702 and the second transducer 704 is $L_3$, and $L_3$ is greater than zero. As shown in FIG. 7, the TOF generating circuit 70 includes a signal generating circuit 71, a transmitter 72 and a receiver 75, wherein the transmitter 72 is coupled to the first transducer 702, and the receiver 75 is coupled to the second transducer 704. Similar to the signal generating circuit 51, transmitter 52 and receiver 55, the signal generating circuit 71 is configured to, under a first ambient factor E1, generate a first signal $S1_3$ from the transmitter 72 through the first transducer 702 to transmit a first transducer signal $TS1_3$, wherein the first transducer signal $TS1_3$ is received by the second transducer 704, and the receiver 75 generates a reference signal $RS_3$ to the signal generating circuit 71. The signal generating circuit 71 is also configured to, under a second ambient factor E2, generate a second signal $S2_3$ from the transmitter 72 through the first transducer 702 to transmit a second transducer signal $TS2_3$, wherein the second transducer signal $TS2_3$ is received by the second transducer 704, and the receiver 75 generates an input signal $IN_3$ to the signal generating circuit 71. In the present embodiment, the signal generating circuit 71 includes a storage device (not shown in the drawing), configured to store the input signal $IN_3$ and the reference signal $RS_3$ received by the receiver 75.

The TOF generating circuit 70 further includes a correlation circuit 76, a measuring circuit 77, a transformation circuit 78, a compensation circuit 79, a synthesis circuit 80, and a processing circuit 81. The TOF generating circuit 70 combines the features of the TOF generating circuit 30 and the TOF generating circuit 50, and the processing circuit 81 selectively controls the operation of the TOF generating circuit 70 under a mode or second mode. More specifically, when the processing circuit 81 controls the TOF generating circuit 70 to operate under the first mode, the correlation circuit 76 receives the reference signal $RS_3$ and the input signal $IN_3$ from the signal generating circuit 71 and performs a correlation operation on the reference signal $RS_3$ and the input signal $IN_3$ to generate a correlation signal $COR_3$, wherein the correlation operation includes performing the fast Fourier transform on the reference signal $RS_3$ and the input signal $IN_3$, whereas the correlation signal $COR_3$ represents the correlation phase response between the reference signal $RS_3$ and the input signal $IN_3$. The measuring circuit 77 receives the correlation signal $COR_3$ from the correlation circuit 76 and measures the correlation signal $COR_3$ to generate a measurement signal $MS_3$. Referring to the embodiment in FIG. 7, after performing the correlation operation on the reference signal $RS_3$ and the input signal $IN_3$, a phase difference $\varnothing_3$ between the reference signal $RS_3$ and the input signal $IN_3$ is obtained. In other words, the measurement signal $MS_3$ represents the phase difference $\varnothing_3$. As discussed above, the phase difference $\varnothing_3$ can be expressed as $\varnothing_3 = \varnothing 0_3 + S_3 \cdot L_3$; in other words, the measurement signal $MS_3$ includes a first measurement signal $MS1_3$ and a second measurement signal $MS2_3$, wherein the first measurement signal $MS1_3$ represents the phase compensation indicated by $S_3 \cdot L_3$, whereas the second measurement signal $MS2_3$ represents the ambient deviation indicated by $\varnothing 0_3$. In the present embodiment, the measuring circuit 77 adopts the LMS method to obtain the measurement signal $MS_3$.

Referring back to FIG. 8, the transformation circuit 78 receives the measurement signal $MS_3$ and the second measurement signal $MS2_3$ from the measuring circuit 77, and then subtracted the second measurement signal $MS2_3$ from the measurement signal $MS_3$ to obtain the first measurement signal $MS1_3$, and transform the first measurement signal $MS1_3$ from a frequency domain into a time domain to obtain the TOF difference signal $TOF_3$. In some embodiments, transformation circuit 78 may simultaneously obtain the measurement signal $MS_3$, the first measurement signal $MS1_3$, and the second measurement signal $MS2_3$, and transform the first measurement signal $MS1_3$ from the frequency domain into the time domain to obtain the TOF difference signal TOF3. In this case, the TOF difference signal TOF3 represents the TOF difference when the input signal $IN_3$ and the reference signal $RS_3$ fly between the first transducer 702 and the second transducer 704.

Since the transformation circuit 78 deducts the part of the ambient deviation caused by the temperature represented by the second measurement signal $MS2_3$ from the TOF difference signal $TOF_3$, the thus-obtained TOF difference signal $TOF_3$ will only include less variation due to the temperature change. In other words, the TOF generating circuit proposed by the present application can be used to obtain a more accurate TOF difference signal $TOF_3$. It should be noted that, during the operation when the transformation circuit 78 outputs the TOF difference signal $TOF_3$, it is feasible to first transform the measurement signal $MS_3$ from the frequency domain into the time domain, and then a portion of the second measurement signal $MS2_3$ with a fixed multiplicity is subtracted from the time domain to obtain the first measurement signal $MS1_3$.

In general, depending on the actual application requirements, the transformation circuit 38 may selectively transform the measurement signal $MS_1$ or the first measurement signal $MS1_1$ from the frequency domain into the time domain to obtain the TOF difference signal $TOF_1$.

In some embodiments, the TOF generating circuit 70 further includes a calculation circuit (not shown in the drawing), configured to calculate the flow speed of the fluid according to the TOF difference signal and the TOF difference signal $TOF_2$, and then calculate the flow rate of the fluid.

When the processing circuit 81 controls the TOF generating circuit 70 to operate under the second mode, the correlation circuit 76 receives input signal $IN_3$ from the signal generating circuit 71 and receives the synthesized signal $SS_3$ from synthesis circuit 80, and perform a correlation operation on the input signal $IN_3$ and the synthesized signal $SS_3$ to generate a correlation signal $COR_3$, wherein the correlation operation includes performing the fast Fourier transform on the synthesized signal $SS_3$ and the input signal $IN_3$, whereas the correlation signal $COR_3$ represents the correlation phase response between the synthesized signal $SS_3$ and the input signal $IN_3$. The measuring circuit 77 receives the correlation signal $COR_3$ from correlation circuit 76 and measures the correlation signal $COR_3$ to generate a measurement signal $MS_3$. As discussed above, the measurement signal $MS_3$ includes a first measurement signal $MS1_3$ and a second measurement signal $MS2_3$, wherein the first measurement signal $MS1_3$ represents the phase compensation indicated by $S_3 \cdot L_3$, whereas the second measurement signal $MS2_3$ represents the ambient deviation indicated by $\varnothing 0_3$.

The compensation circuit 79 receives the input signal $IN_3$ from the signal generating circuit 71 and receives the first measurement signal $MS1_3$ of the measurement signal $MS_3$ from the measuring circuit 77, and performs compensation on the input signal $IN_3$ according to the first measurement signal $MS1_3$ to generate a compensation signal $CS_3$. More specifically, $S_3 \cdot L_3$ represented by the first measurement signal MS13 may be further expressed as $e^{-j \cdot S_3 \cdot L_3}$; therefore, in order to compensate for the phase compensation represented by $S_3 \cdot L_3$, the compensation circuit 79 multiplies the input signal $IN_3$ by $e^{-j \cdot S_3 \cdot L_3}$ and then performs the complex conjugate computation to compensate for the difference generated by the $S_3 \cdot L_3$, so as to generate the compensation signal $CS_3$.

The synthesis circuit 80 receives the reference signal $RS_3$ from the signal generating circuit 71 and receives the reference signal $RS_3$ from the compensation circuit 79, and then synthesize the reference signal $RS_3$, and with compensation signal $CS_3$ with a specific ratio to generate the synthesized signal $SS_3$. More specifically, the synthesized signal $SS_3$ can be expressed as $SS_3 = (n-1)/n * RS_3 + 1/n *$ compensation signal $CS_3$, where n is an integer greater than 1; in this way, the reference signal $RS_3$ is corrected to a waveform close to the input signal $IN_3$ in each feedback.

The transformation circuit 78 receives the measurement signal $MS_3$ from the measuring circuit 77 and transforms the measurement signal $MS_3$ from a frequency domain into a time domain to obtain the TOF difference signal $TOF_3$. Through continuous iteration, the phase difference (i.e., $S_3 \cdot L_3$) caused by the flow speed of the fluid will gradually decrease, so as to obtain a more accurate TOF difference signal $TOF_3$.

It should be noted that the TOF generating circuit 70 may further include a receiver coupled to the first transducer 702 and a transmitter coupled to the second transducer 704, and under the first ambient factor E1 and the second ambient factor E2, it is feasible to use the transmitter coupled to the second transducer 704 to transmit two signals to the receiver coupled to the first transducer 702, so as to generate the reference signal and the input signal, respectively. Then, the TOF difference signal is generated following the above-mentioned embodiment discussed in connection with FIG. 8. In some embodiments, the TOF generating circuit 70 further includes a calculation circuit (not shown in the drawing), configured to calculate the flow speed of the fluid according to the TOF difference signal and the TOF difference signal $TOF_3$, and then calculate the flow rate of the fluid.

Figure 9:
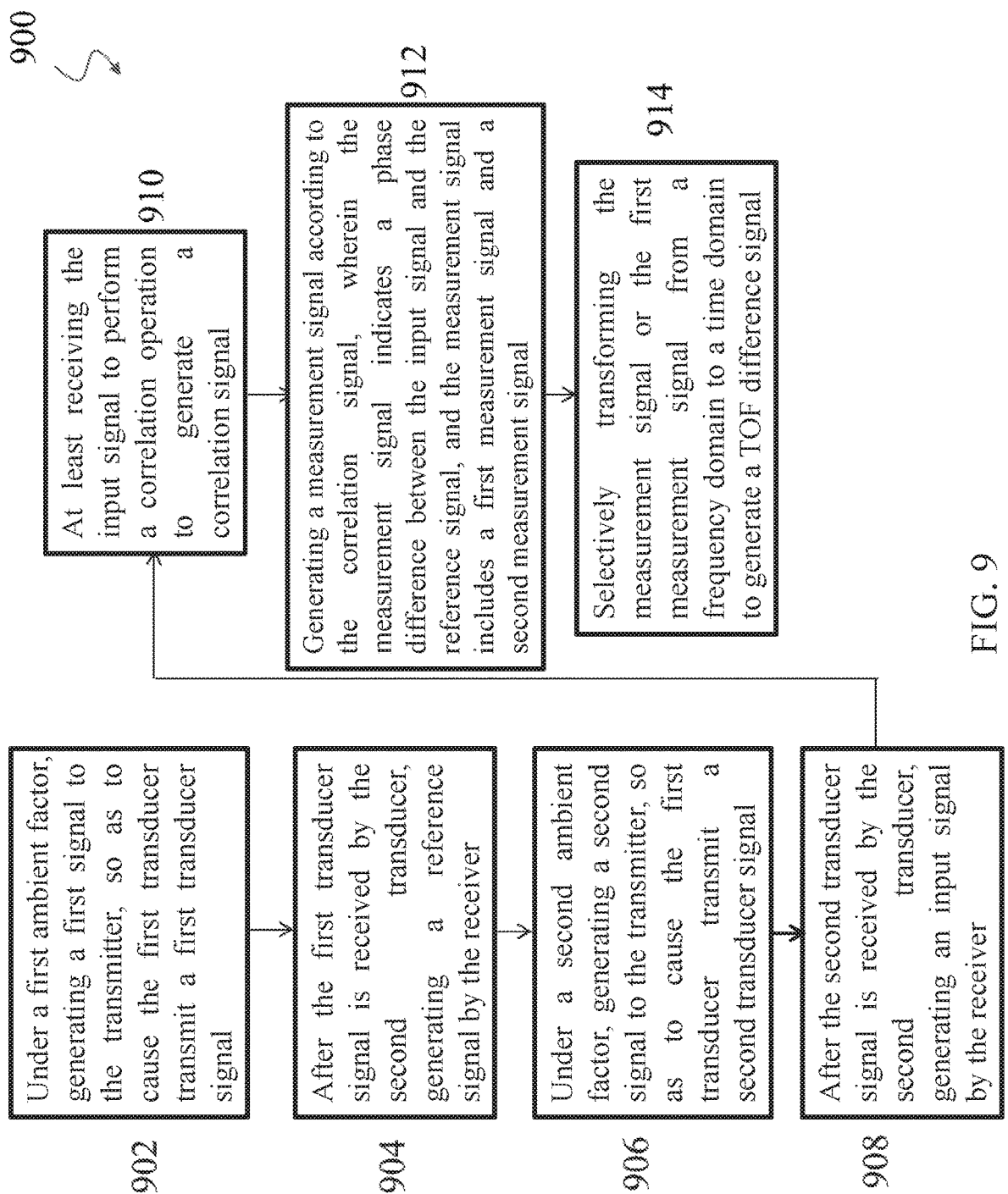
FIG. 9 is a flow chart illustrating the TOF generate method according to the embodiments of the present application.

FIG. 9 is a flow chart illustrating the TOF generate method 900 according to embodiments of the present application. The present application is not limited to all the steps shown in FIG. 9, if substantially the same result can be achieved. The method 900 is configured to control a transmitter and receiver, wherein the transmitter is coupled to a first transducer, and the receiver is coupled to a second transducer, wherein the distance between the first transducer and the second transducer is greater than zero, and the fluid having a flow speed flows sequentially through the first transducer and the second transducer. The method 900 is summarized as follows:

Step 902: Under a first ambient factor, generating a first signal from the transmitter, so that the first transducer transmits a first transducer signal.

Step 904: After the first transducer signal is received by the second transducer, using the receiver to generate a reference signal.

Step 906: Under a second ambient factor, generating a second signal from the transmitter, so that the first transducer transmits a second transducer signal.

Step 908: After the second transducer signal is received by the second transducer, using the receiver to generate an input signal.

Step 910: Receiving at least the input signal to perform a correlation operation to generate a correlation signal.

Step 912: Generating a measurement signal according to the correlation signal, wherein the measurement signal indicates a phase difference between the input signal and the reference signal, and the measurement signal includes a first measurement signal and a second measurement signal, wherein the first measurement signal is configured to indicates a phase compensation of the input signal and the reference signal, and the second measurement signal indicates a phase offset of the first transducer and the second transducer.

Step 914: Selectively transforming the measurement signal or the first measurement signal from a frequency domain to a time domain to generate a TOF difference signal.

Persons having ordinary skill in the art can readily understand the details of the method 900, upon reading embodiment of FIG. 8, and hence a detailed description thereof is omitted herein for the sake of brevity.

What is claimed is:

1. A time-of-flight (TOF) generating circuit, coupled to a first transducer and a second transducer, wherein there is a distance greater than zero between the first transducer and the second transducer, and the first transducer and the second transducer are arranged in a pipeline filled with fluid, wherein the TOF generating circuit comprises:
a transmitter, coupled to the first transducer;
a receiver, coupled to the second transducer;
a signal generating circuit, configured to, under a first ambient factor, generate a first signal to the transmitter to cause the first transducer transmit a first transducer signal, wherein the first transducer signal is received by the second transducer and the receiver generates a reference signal to the signal generating circuit; and, under a second ambient factor, generate a second signal to the transmitter to cause the first transducer transmit a second transducer signal, wherein the second transducer signal is received by the second transducer and the receiver generates an input signal to the signal generating circuit;
a correlation circuit, configured to at least receive the input signal to perform a correlation operation to generate a correlation signal; and
a measuring circuit, configured to generate a measurement signal according to the correlation signal, wherein the measurement signal indicates a phase difference between the input signal and the reference signal, and the measurement signal includes a first measurement signal and a second measurement signal, wherein the first measurement signal is configured to indicate a phase compensation of the input signal and the reference signal, and the second measurement signal is configured to indicate a phase offset of the first transducer and the second transducer; and
a transformation circuit, configured to selectively transform the measurement signal or the first measurement signal from a frequency domain to a time domain to generate a TOF difference signal, wherein the T F difference signal is configured to indicate a difference of flight times between the first transducer and the second transducer.

2. The TOF generating circuit of claim 1, further comprising:
a processing circuit, configured to control the TOF generating circuit to selectively operate in a first mode or a second mode to perform different calibrations on the TOF generating circuit.

3. The TOF generating circuit of claim 2, wherein, in the first mode, the correlation circuit receives the input signal and generates the correlation signal according to the input signal and the reference signal, and the transformation circuit transforms the first measurement signal from the frequency domain to the time domain, to generate the TOF difference signal.

4. The TOF generating circuit of claim 2, further comprising:
a compensation circuit, coupled to the measuring circuit and configured to perform a compensation operation on the input signal to generate a compensation signal according to the first measurement signal in the second mode.

5. The TOF generating circuit of claim 4, further comprising:
a synthesis circuit, coupled to the compensation circuit and the signal generating circuit and configured to synthesize the reference signal and the compensation signal by using a specific ratio to generate a synthesized signal and output the synthesized signal to the correlation circuit.

6. The TOF generating circuit of claim 5, wherein the synthesized signal is expressed by the following equation:
the synthesized signal (n−1)/n*the reference signal+1/n*the compensation signal, wherein n is an integer greater than 1.

7. The TOF generating circuit of claim 5, wherein, in the second mode, the correlation circuit receives the input signal and the synthesized signal to generate the correlation signal, and the transformation circuit transforms the measurement signal from the frequency domain to the time domain to generate the TOF difference signal.

8. The TOF generating circuit of claim 1, further comprising:
a compensation circuit, coupled to the measuring circuit and configured to perform a compensation operation on the input signal according to the phase compensation, and generate a compensation signal after performing the compensation operation.

9. The TOF generating circuit of claim 8; further comprising:
a synthesis circuit, coupled to the compensation circuit and configured to synthesize the reference signal and the compensation signal by using a specific ratio to generate a synthesized signal and output the synthesized signal to the correlation circuit, so that the correlation circuit receives the input signal and the synthesized signal to generate the correlation signal.

10. The TOF generating circuit of claim 1, wherein the first ambient factor and the second ambient factor comprise a difference in ambient temperature and/or the flow speed.

11. A flow meter, comprising:
the TOF generating circuit of claim 1.

12. A chip, comprising:
a TOF generating circuit, coupled to a first transducer and a second transducer, wherein there is a distance greater than zero between the first transducer and the second transducer, and the first transducer and the second transducer are arranged in a pipeline filled with fluid:
wherein the TOF generating circuit comprises:
a transmitter, coupled to the first transducer;
a receiver, coupled to the second transducer;
a signal generating circuit, configured to, under a first ambient factor,
generate a first signal to the transmitter to cause the first transducer transmit a first transducer signal, wherein the first transducer signal is received by the second transducer and the receiver generates a reference signal to the signal generating circuit; and, under a second ambient factor, generate a second signal to the transmitter to cause the first transducer transmit a second transducer signal, wherein the second transducer signal is received by the second transducer and the receiver generates an input signal to the signal generating circuit;
a correlation circuit; configured to at least receive the input signal to perform a correlation operation to generate a correlation signal; and
a measuring circuit, configured to generate a measurement signal according to the correlation signal, wherein the measurement signal indicates a phase difference between the input signal and the reference signal, and the measurement signal includes a first measurement signal and a second measurement signal; wherein the first measurement signal is configured to indicate a phase compensation of the input signal and the reference signal, and the second measurement signal is configured to indicate a phase offset of the first transducer and the second transducer; and
a transformation circuit, configured to selectively transform the measurement signal or the first measurement signal from a frequency domain to a time domain to generate a TOF difference signal, wherein the TOF difference signal is configured to indicate a difference of flight times between the first transducer and the second transducer.

13. A TOF generation method, configured to control a transmitter and a receiver, wherein the transmitter is coupled to a first transducer, and the receiver is coupled to a second transducer, wherein there is a distance greater than zero between the first transducer and the second transducer, and the first transducer and the second transducer are arranged in a pipeline filled with fluid, wherein the TOF generation method comprises:
under a first ambient factor, generating a first signal to the transmitter to cause the first transducer transmit a first transducer signal;
after the first transducer signal is received by the second transducer, generating a reference signal by using the receiver;
under a second ambient factor, generating a second signal to the transmitter to cause the first transducer transmit a second transducer signal;
after the second transducer signal is received by the second transducer, generating an input signal by using the receiver;
at least receiving the input signal to perform a correlation operation to generate a correlation signal;
generating a measurement signal according to the correlation signal, wherein the measurement signal indicates a phase difference between the input signal and the reference signal, and the measurement signal comprises a first measurement signal and a second measurement signal, wherein the first measurement signal is configured to indicates a phase compensation of the input signal and the reference signal, and the second measurement signal indicates a phase offset of the first transducer and the second transducer;
selectively transforming the measurement signal or the first measurement signal from a frequency domain to a time domain to generate a TOF difference signal, wherein the TOF difference signal is configured to indicate a difference of flight times between the first transducer and the second transducer.

14. The TOF generation method of claim 13, further comprising:
selectively operating in a first mode or a second mode to perform different calibrations on the TOF generating circuit.

15. The TOF generation method of claim 14, wherein the at least receiving the input signal to perform the correlation operation to generate the correlation signal comprises:
in the first mode, receiving the input signal and generates the correlation signal according to the input signal and the reference signal, and
the selectively transforming the measurement signal or the first measurement signal from the frequency domain to the time domain to generate the TOF difference signal comprises:
transforming the first measurement signal from the frequency domain to the time domain to generate the TOF difference signal.

16. The TOF generation method of claim 14, further comprising:
in the second mode, performing a compensation operation on the input signal according to the phase difference to generate a compensation signal.

17. The TOF generation method of claim 16, further comprising:
synthesizing the reference signal and the compensation signal by using a specific ratio to generate a synthesized signal.

18. The TOF generation method of claim 17, wherein the synthesized signal is expressed as:
the synthesized signal=$(n-1)/n*$the reference signal$\pm 1/n*$the compensation signal, wherein n is an integer greater than 1.

19. The TOF generation method of claim 16, wherein, the at least receiving the input signal to perform the correlation operation to generate the correlation signal comprises:
in the second mode, receiving the input signal and the synthesized signal to generate the correlation signal; and
the selectively transforming the measurement signal or the first measurement signal from the frequency domain to the time domain to generate the TOF difference signal comprises:

transforming the measurement signal from the frequency domain to the time domain to generate the TOF difference signal.

20. The TOF generation method of claim 13, wherein the first ambient factor and the second ambient factor comprise a difference in ambient temperature or flow speed of the fluid.

\* \* \* \* \*